United States Patent [19]

Okada

[11] Patent Number: 4,895,128

[45] Date of Patent: Jan. 23, 1990

[54] UNDERWATER SPEAR GUN

[76] Inventor: Douglas Okada, 21203 S. Harvard, Torrance, Calif. 90501

[21] Appl. No.: 191,182

[22] Filed: May 6, 1988

[51] Int. Cl.$^4$ .............................................. F41B 7/04
[52] U.S. Cl. ........................................ 124/22; 124/31
[58] Field of Search ............... 124/22, 21, 20 B, 20 R, 124/31, 35 R, 17, 26, 83

[56] References Cited

U.S. PATENT DOCUMENTS

| | | | |
|---|---|---|---|
| 1,839,640 | 1/1932 | Bowles . | |
| 2,663,291 | 12/1953 | Hall . | |
| 2,762,358 | 9/1956 | Kinnaman | 124/22 |
| 2,923,286 | 2/1960 | Draganti | 124/31 X |
| 3,016,891 | 1/1962 | Eeling | 124/22 |
| 3,108,583 | 10/1963 | Andis | 124/22 |
| 3,126,880 | 3/1964 | Loe | 124/22 |
| 3,262,441 | 7/1966 | Senne | 124/22 |
| 3,265,054 | 8/1966 | Gruenenfelder | 124/22 |
| 3,585,979 | 6/1971 | Hendricks | 124/22 |
| 3,773,026 | 11/1973 | Romero | 124/22 |
| 4,386,598 | 6/1983 | Blaser | 124/21 |

FOREIGN PATENT DOCUMENTS

| 0888345 | 9/1943 | France | 124/22 |
|---|---|---|---|
| 0053246 | 12/1944 | France | 124/22 |

OTHER PUBLICATIONS

"Beginner's Guide to Spearfishing", Skin Diver Magazine, Jun. 1978, pp. 10-13.
"Pneumatic Spearguns", Skin Diver Magazine, Sep. 1979, pp. 58-63.
"Choose Your Weapon", Skin Diver Magazine, Oct. 1977, pp. 34-39.

Primary Examiner—Randolph A. Reese
Assistant Examiner—Peter M. Cuomo
Attorney, Agent, or Firm—Milton S. Gerstein

[57] ABSTRACT

An underwater spear gun of the rubber-band powered type, in which a spear is provided having a plurality of upwardly-projecting tail fins. The spear-shaft is positioned within a bore of a barrel, which barrel has longitudinal channel formed in an outer peripheral surface extending the entire length of the barrel through which project the tail fins. Each rubber band used for powering is stretched about one tail fin. The spear gun also has a unique triggering mechanism directly connected to the line-release lever for a safer and more easily handled gun.

16 Claims, 3 Drawing Sheets

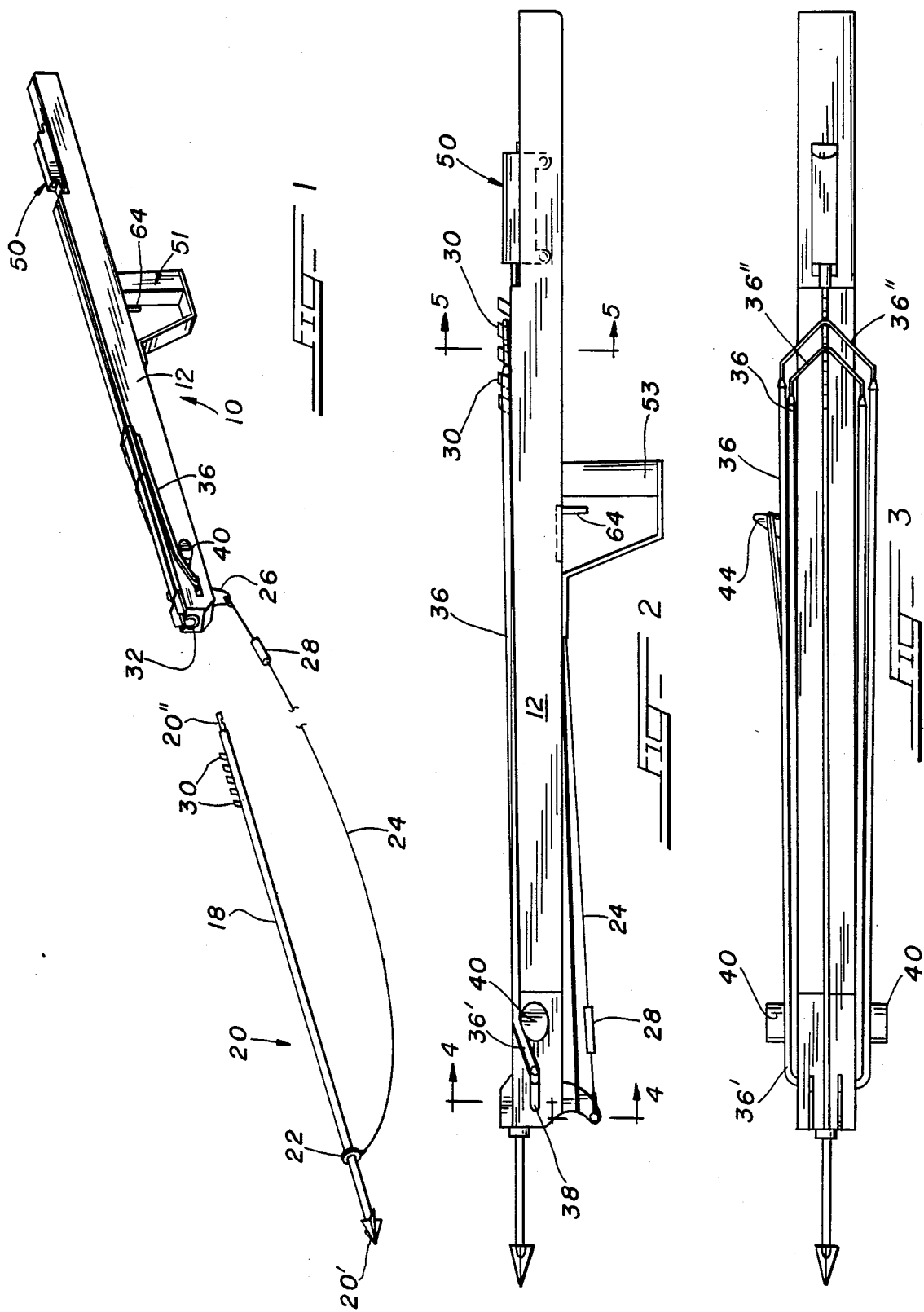

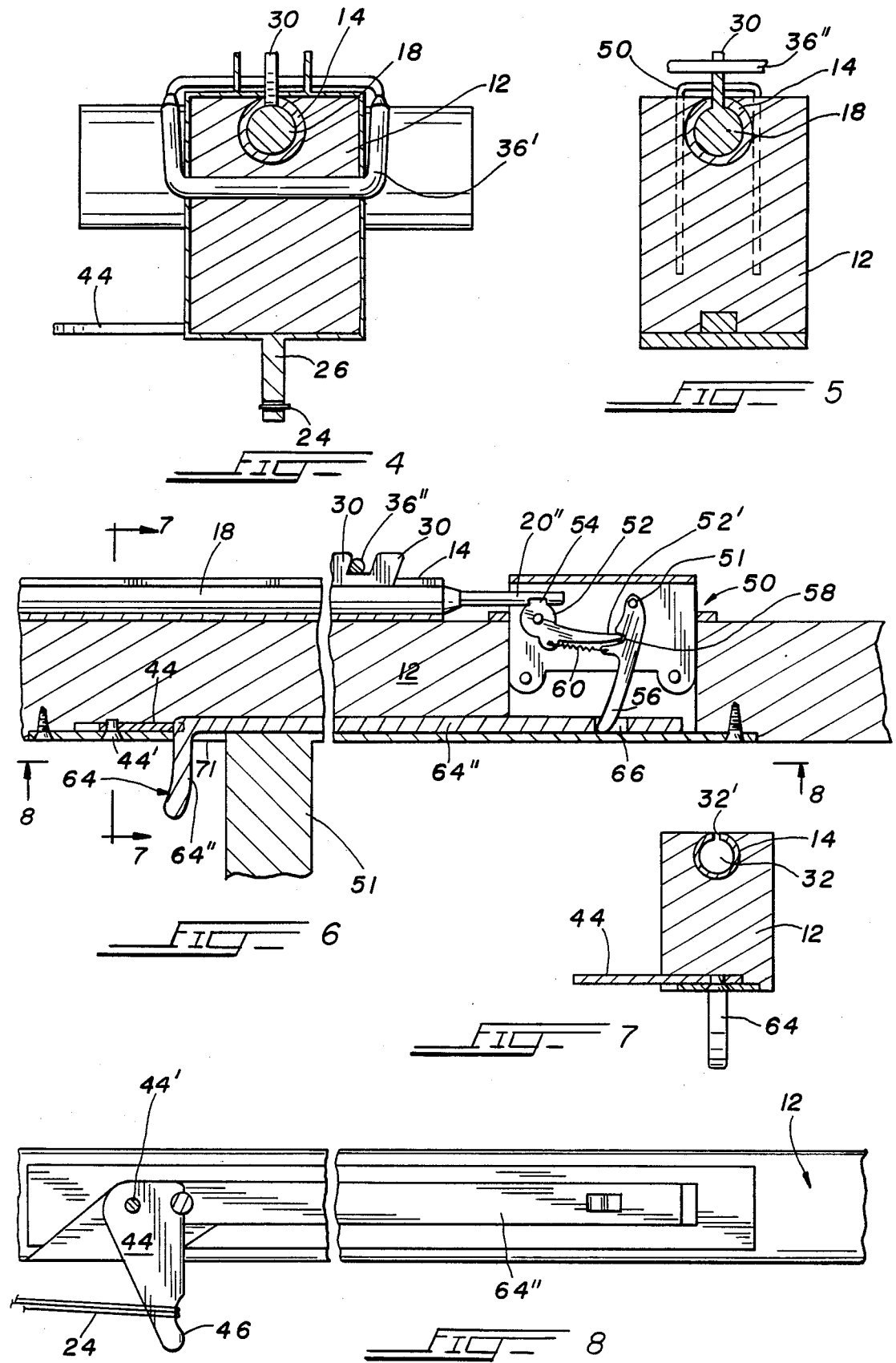

UNDERWATER SPEAR GUN

BACKGROUND OF THE INVENTION

The present invention is directed to an underwater spear gun of the surgical-band, or sling, type. Conventional spear guns may be classified according to two general types: The pneumatic spear gun, which utilizes an air-driven, piston to drive the spear shaft down a rifle-like barrel; and a rubber-powered, or sling-type, spear gun, in which one or more rubber bands propel the spear shaft after trigger. The first type of spear gun—the pneumatic—is advantageous in that it is a relatively accurate device, allowing accurate aiming of the spear. However, it is disadvantageous since the power to drive the spear shaft is limited by the physical strength of the user of the gun, since, during loading, the air is further compressed and the piston set by the diver himself. The only way to increase the power of such a spear gun is to increase the initial pressure of the compressed air. If such initial pressure were to be too great, the diver would not be able overcome it during each loading. Thus, each pneumatic spear gun has a limit to the maximum power output thereof, which also is directly dependent upon the diver's strength. In contradistinction, the advantage of the rubber-powered spear gun is the ability for greater power input, and, therefore, allows greater spear-shaft speeds. However, the disadvantage is the poor aiming accuracy associated therewith. The enhanced power input derives from the fact that one or more individual rubber bands may be used to power the spear shaft, the total power input being the sum of the individual bands. Since the maximum strength required for a diver to load such a spear gun is only his ability to stretch and load one rubber band, the power input is not limited by the diver's strength, since he may load a plurality of such rubber bands, each band being loaded independently of the others, and each requiring the same amount of effort on the part of the diver. Thus, loading two such rubber bands will double the power input relative to one rubber band, with each band being loaded by the diver requiring the same load-effort. However, since the barrel of the spear gun for such rubber-powered types must be exposed along its length for approximately 180 degrees about the circumference thereof, accuracy is sacrificed, since upon the triggering of the device, the rearward-end of the spear shaft is caused up-and-down oscillation as each rubber band shortens in length during firing. That is to say, the more rubber bands used, the greater the power output for the spear-shaft, which additional force, however, leads to the bowing of the spear-shaft proper, thus reducing aiming accuracy. Tests have shown that after launching of the spear, the tip of the spear remains relatively stationary to the spear-shaft proper, which, as mentioned above, oscillates.

SUMMARY OF THE INVENTION

It is, therefore, the primary objective of the present invention to provide an underwater spear gun of the rubber-powered type, which retains the power-advantages of the rubber-type but increases the aiming accuracy thereof, such that it is comparable to the aiming accuracy of the pneumatic-type of spear gun.

It is another objective of the present invention to provide such an accurate and high-powered spear gun that provides a more advanced line-release mechanism that is operable simultaneously with the triggering of the gun.

Toward these and other ends, the underwater spear gun of the invention is provided with a barrel that is, in the first embodiment, substantially circular in cross section, which barrel has a longitudinally-extending upper slot or channel. Associated with the gun is a specially-designed spear shaft having a circular cross section, and from the upper circumferential surface of which projects upwardly a plurality of fins, which fins protrude outwardly from the barrel through the channel thereof. Each fin has a dual purpose: Its first function is to allow for one rubber, or surgical, band to be stretched thereabout, in order to power-load the spear shaft, while its second function is to guide the spear-shaft down the barrel during firing, so that the shaft does not bend or oscillate in the transverse directions so that the spinning thereof is eliminated, all of which leads to increased aiming accuracy by keeping the longitudinal axis of the spear-shaft parallel at all times to the longitudinal axis of the gun barrel proper. To also aid in aiming accuracy, as well as to enhance the operation of the gun, the trigger-lever is positioned in direct operative engagement with the line-release. Also, since the spear-shaft is contained within a barrel, even if the line-release mechanism did not function, any recoil of the spear would be prevented from striking the diver, since the end of the barrel would prevent such from occurring, which is not the case in the prior-art rubber-powered spear guns.

BRIEF DESCRIPTION OF THE DRAWINGS

The invention will be more readily understood with reference to the accompanying drawing, wherein:

FIG. 1 is an isometric view of the underwater, rubber-powered spear, gun of the invention;

FIG. 2 is a side elevation view thereof;

FIG. 3 is a top view thereof;

FIG. 4 is a cross-sectional view taken along line 4—4 of FIG. 2;

FIG. 5 is a cross-sectional view taken along line 5—5 of FIG. 2;

FIG. 6 is a partial cross-sectional view showing the triggering mechanism and line-release mechanism according to the invention shown in their cocked, ready-for-firing state;

FIG. 7 is a cross-sectional view taken along line 7—7 of FIG. 6;

FIG. 8 is a partial cross-sectional view taken along line 8—8 of FIG. 6;

DETAILED DESCRIPTION OF THE INVENTION

Figure 10:
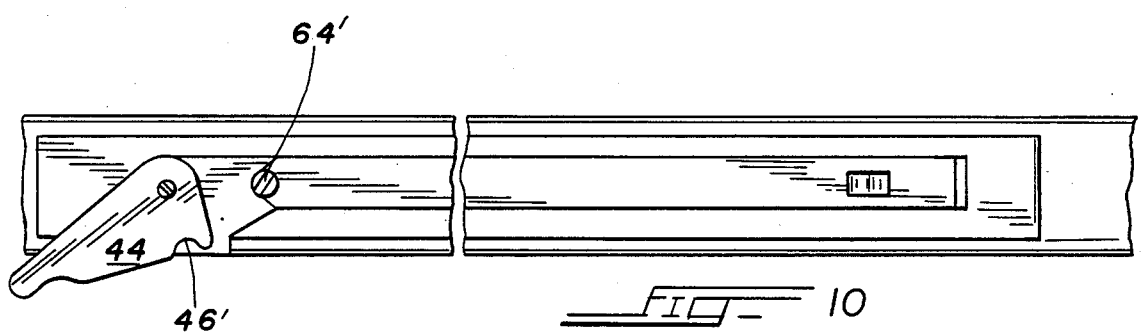
FIG. 10 is a partial cross-sectional view similar to FIG. 8, but showing the line-release lever in its state after firing.

Referring now to the drawings in greater detail, the rubber-powered spear-gun of the present invention is indicated generally by reference numeral 10. The spear-gun is preferably made of a composite of wood and aluminum, the main stock 12 of the gun being made of wood, with there being provided an aluminum slotted barrel 14 (see FIG. 4) described below in greater detail inserted into the upper part of the wood stock. It is, of course, to be understood that the type of material used may be altered. This slotted barrel 14 is best seen in FIGS. 4–7, and is, in the preferred embodiment, circular in cross section for receiving therein a similar circular cross-sectioned shaft 18 of a spear 20. The spear 20 has a conventional sharpened tip-end 20', and rear notched end 20" for receiving a portion of the loading mechanism therein. Operatively associated with the shaft 18 is a slide-ring 22. One end of a line 24 is fixedly secured to the slide ring, with the other end of the line 24 being fixedly secured to the forward end of the gun stock via a bracket 26. The line 24 is used for retrieving or pulling in the spear after firing, with a shock-tube 28 protecting the line from the excessive strain during firing, in the conventional manner. The spear 20 of the invention is provided with a plurality of rearwardly-positioned tail fins 30. Preferably, there are provided five such fins 30, although any number may be provided as long as it is in the keeping of the spirit of the present invention. In the preferred embodiment, each fin has a height taken in the direction transverse to the longitudinal center axis of the spear of approximately ½ inch, and a total length also of ½ inch taken in the longitudinal direction. The shaft 18 of the spear is received within the circular bore 32 of the barrel 14, which barrel also has a longitudinal slot or channel 32' through which project the tail fins 30, as best seen in FIGS. 2–6. The channel 32' extends substantially the entire length of the barrel 14, so that the spear shaft 18 is guided therealong during firing, which thereby prevents rotation or spinning of the spear-shaft proper, and bending of the shaft 18 in the transverse directions. Each tail fin 30 is may be used for loading one conventional rubber or surgical powering band 36. Each band is a closed loop, as can be seen in FIG. 3, and has a first loop-end 36' positioned in a forward portion of the gun-stock 14, in a horizontal slot 38. Each band also has a second loop-end 36" entrained about one of the tail fins 30, as best seen in FIG. 6. While only two such rubber powering bands 36 are shown in the drawings, up to five such bands may be provided when five such tail fins 30 are used. With the second loop-ends 36" in place against the respective tail fins, the spear is ready to be powered and forced from the barrel 14 upon the triggering of the gun, which is described below in greater detail. Each rubber or surgical band is loaded by hand by the diver, with each band stretched and loaded providing an equal powering force and power input for the spear shaft, so that four such bands would provided approximately twice the firing power as two such bands. To prevent the bending of the spear shaft 18 in the vertical direction, a cylindrical member 40 is provided for changing the direction of each rubber band 36 such that each band 36 lies substantially horizontally from the direction-changing member 40 to the tail fins 30, as is clearly evident in FIGS. 1 and 2. The member 40 projects from either side face of the stock 12, as clearly shown in FIG. 3. The member 40 ensures that the releasing force provided by the plurality of rubber bands 36 is directed along the central longitudinal axes of the barrel 14 and spear-shaft 18, which axes are parallel to each other during the entire firing process, as explained above. Thus, practically speaking, all torques tending to cause the bending of the spear-shaft in a vertical direction are eliminated. Therefore, also, since the force of each rubber band is substantially parallel to the central longitudinal axis of the barrel 14, each band itself tends to produce a greater effective, useful firing force, since the entire force of the band has been redirected along the usable longitudinal direction, as compared with prior-art rubber-powered spear-guns. The spear-gun 10 of the invention is also provided with a line-release lever 44 which extends substantially horizontally-outwardly from the bottom surface of the wood stock 12, as best seen in FIG. 8. The lever 44 is pivotally connected to the underside of the wood stock via a pivot pin 44', and is provided with a notched end 46 about which is wrapped portions of the spear-line 24, so that after firing, the spear may be retrieved by pulling in the line 24, an end of which is affixed to the bracket 26. The line 24 is initially coiled a few times between and about the bracket 26 and the lever 44, in the manner shown in FIGS. 2 and 8. In the cocked, ready-to-fire state of the spear-gun, the lever 44 extends substantially at right angles to the planar lower surface of the stock 12, as shown in FIG. 8, while after the trigger mechanism has been actuated, it extends at an acute angle, as shown in FIG. 10, so that ample space is provided for allowing of the clearance of the line 24 past the lever 44 during firing. In accordance with the present invention, the line-release lever mechanism 44 is directly connected to the trigger lever that operates the triggering mechanism, so that the triggering and line-release actions occur substantially simultaneously.

Figure 9:
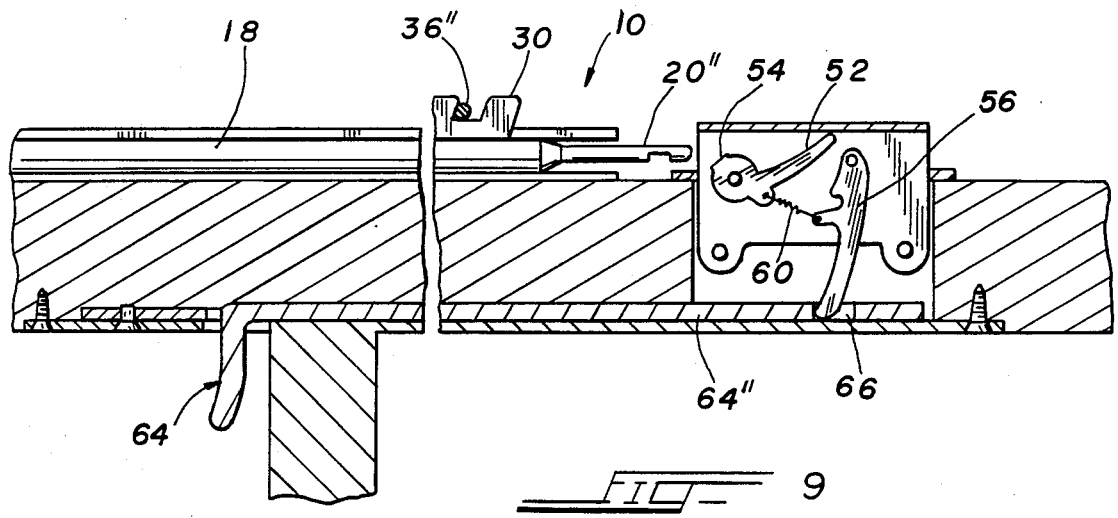
FIG. 9 is a partial cross-sectional view similar to FIG. 6, but showing the triggering and line-release mechanisms after firing.

The triggering mechanism proper is indicated by reference numeral 50, as is best seen in FIGS. 6 and 9. This triggering mechanism proper is old in the art, but has been adapted to the spear-gun of the present invention in order to achieve the more simultaneous release of the lever 44 along therewith. The triggering mechanism 50 has a pivotal catch 52 having an enlarged cam projection 54 for reception in the notch of the notched end 20" of the spear 20 for loading and readying the gun for firing. A lever 56 is also pivotal, and in the conventional use of this triggering mechanism, acts as the trigger lever thereof. This lever 56 has a notch 58 for receiving therein the end 52' of the pivotal catch 52 during the cocked state, with a spring 60 interconnecting the levers 52 and 56. The cocked state of the triggering mechanism is shown in FIG. 6, with the spring 60 ready to rotate the lever 52 in the counterclockwise direction when the end 52' is released from its engagement with the notch 58, which is achieved by pivoting the lever 56 in the counterclockwise direction when viewing FIG. 6, about pivot pin 51. This causes the disengagement of the notched end 20" of the spear shaft with the cam projection 54, to thereby allow for the rubber bands to propel the spearshaft along the barrel 14. Whereas the lever 56 in the prior-art devices has served as the manually-operated trigger-lever, in the present invention such is achieved via trigger-member 64 best seen in FIG. 6. The trigger member essentially L-shaped and includes a downwardly-projecting portion 64' integrally connected to a flat bar extension 64" that is slidable in a groove formed in the lower portion of the interior of the wood stock 12. The portion 64' projects outwardly through a cutout 71 formed in the bottom of the wood stock 14. This bar extension 64" is provided with an opening 66 for receiving therein the lower end of the lever 56, as shown in FIG. 6. Thus, when the portion 64' is squeezed by the finger of the hand, in pistol-grip fashion, the bar extension 64" is moved to the right when viewing FIG. 6, to thus cause the counterclockwise rotation of the lever 56, which thereby releases the catch-lever 52, which in turn releases the spear-shaft, so that the triggering mechanism assumes the after-firing state shown in FIGS. 9 and 10. In the cocked state of FIG. 6, the downwardly-projecting lever 64' is biased against the line-release lever 44. The line-release lever 44 has an upper recess 46' (FIG. 10) for receiving therein a portion of the lever 64', the lever 64' being circular in cross section, and the recess 46' being semicircular in shape. The lever 64' is biased against the line-release member via the spring 60 acting through the trigger-lever 56. It may, therefore, be seen that upon the triggering of the triggering mechanism 50 by squeezing the lever portion 64' via the pistol grip handle 53, the line-release mechanism is automatically and simultaneously released to free the line 24. To reset and recock the gun after having been fired, the spear-shaft is move along the barrel interior with the tail fins moving along the channel 32, until the notched end 20" causes the clockwise rotation of the catch lever 52, so that the cam projection 54 is again seated in the notched end 20", in the conventional fashion, while also pivoting the line-release lever 44 back to its cocked state shown in FIG. 6 for again receiving therein the portion 64', after which the line 24 may again be wrapped a number of times thereabout.

Figure 11:
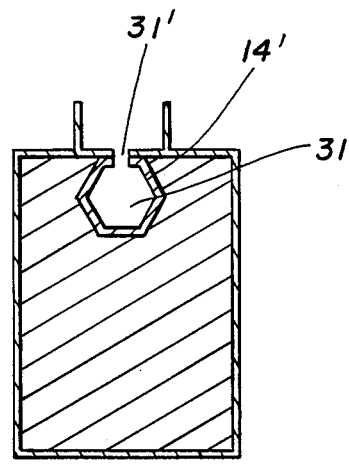
FIG. 11 is a cross-sectional view similar to FIG. 7, but showing a modification of the barrel-bore of the spear-gun of the invention.

The gun barrel 14 may be hexagonal in shape, as shown in the modification of FIG. 11, which defines a hexagonal bore 31. In this case, the shaft of the spear will also be hexagonal. The barrel 14' also defines a longitudinal channel 31' for the projection of the tail fins 30. This modification has the advantage that rotational or spinning movement of the shaft of the spear is totally negated regardless of the positioning of the fins 30 in the channel 31'.

The spear gun of the present invention also is extremely safe as compared to prior art guns, since the actuation of the line-release mechanism is more assured, and, even if such did not actuate, the diver's eyes and face are protected from the returning spear shaft end since it is contained in the barrel 14 along the entire length thereof, which barrel also surrounds the spear shaft except for the area juxtapositioned in the channel 32'. The bore is also closed off by the triggering mechanism 50, which prevents the shaft from ever reaching the face or eye of the diver. In prior art rubber-powered spear guns, the spear shaft, if improperly released, may fly off and rebound outside of the confines of a barrel bore, since there is no bore to speak of.

While a specific embodiment of the invention has been shown and described, it is to be understood that numerous changes and modifications may be made therein without departing from the scope, spirit, and intent of the invention as defined in the appended claims.

What I claim is:

1. In an underwater spear gun comprising a main stock section having an upper portion and a lower portion, said stock section having a front end and a rear end, a spear having a sharpened tip-end, and a shaft, said shaft having a first end connected to said tip-end and a second tail-end, at least one rubber power-band, and triggering means, wherein the improvement comprises:

a barrel affixed to said upper portion of said stock section, said barrel having a longitudinal central axis, and a circumferential wall defining a bore within said barrel in which may be placed said spear, said circumferential wall of said barrel having a longitudinal channel formed in an upper part thereof, said longitudinal channel extending along at least most of the entire length said upper part of said barrel, said spear having a plurality of substantially linearly-arranged tail fins projecting perpendicularly from said shaft, said tail fins being spaced apart along said shaft at least along projecting portions thereof, all of said tail fins projecting upwardly from said shaft and being substantially contained in the same vertical plane;

said shaft being positioned in said bore and said plurality of tail fins projecting outwardly from and beyond said bore through said longitudinal channel; said longitudinal channel having a width only slightly greater than the thickness of each said tail fin so that said tail fins may pass therethrough but be substantially prevented from lateral movement during their travel along said longitudinal channel; said circumferential wall enclosing the greater majority of the circumference of said shaft of said spear;

said at least one rubber power-band having a first end connected to said front end of said stock section, and a second end looped about a respective one of said tail fins whereby said at least one power-band is stretched for powering the spear upon the triggering of the gun by said triggering means.

2. The spear gun according to claim 1, wherein said front end of said stock section comprises a power-band direction-changing means for orienting said power-band in a direction parallel to the longitudinal axis of said barrel for the length of said power-band extending between said direction-changing means and said respective tail fin.

3. The spear gun according to claim 2, wherein said front end of said stock section comprises a substantially horizontal slot in which is positioned said first end of said power-band, said slot lying below said direction-changing means, so that the length of said power-band between said slot and said direction-changing means inclines upwardly along the outside of said stock section.

4. The spear gun according to claim 3, wherein said direction-changing means comprises a first laterally-projecting member projecting outwardly from one side surface of said stock section, and a second laterally-projecting member projecting outwardly from the other side surface of said stock section.

5. The spear gun according to claim 4, wherein said power-band is in the form of a closed loop, said first end thereof being a loop-end engaged for movement in said horizontal slot, and said second end of said power-band being in the form a loop-end and entrained partially about said respective tail fin.

6. The spear gun according to claim 5, comprising a plurality of power-bands, each said power-band having a first end positioned in said slot, and a second end entrained partially about a respective but unique one of said plurality of tail fins, whereby greater power may be provided to the spear.

7. The spear gun according to claim 1, wherein said bore is substantially circular in cross-sectional shape, and said shaft is also circular in cross-sectional shape.

8. The spear gun according to claim 1, wherein said bore is substantially polygonal in cross-sectional shape, and said shaft is also polygonal in cross-sectional shape.

9. The spear gun according to claim 1, further comprising a spear-line and a line-release means; said line having a first end fixedly connected to a mounting portion of said front end of said stock section, and a second end operatively engaged with said line-release means, said line being wrapped about said line-release means and said mounting portion a plurality of times; said line-release means comprising a pivotal lever directly coupled to and directly operable by said triggering means, whereby upon triggering, said line-release means is released substantially simultaneously with said triggering means.

10. The spear gun according to claim 9, wherein said pivotal lever comprises a first lower notch for receiving therein a portion of the spear-line, and a second upper notch for receiving therein a portion of said triggering means, whereby upon removal of said portion of said triggering means from said upper notch, said lever is allowed to rotate to release said spear-line.

11. The spear gun according to claim 10, wherein said triggering means comprises a catch-lever mounted in said rear end of said stock-section for holding said spear-shaft until triggering, a pivotal catch-lever holding and releasing lever for holding said catch-lever in a cocked state until triggering, spring means interconnecting said catch-lever and said holding and releasing lever for biassing said parts into their cocked, ready-to-release state, and a trigger-release member comprising a first flat-bar section having a first forward end and a second rear end, said first section being slidable in a lower portion of said stock-section, and a second integrally-connected pull-member connected to said forward end of said first flat-bar section; said rear end of said first section being in operative engagement with a lower portion of said holding and releasing lever, so that when said second pull-member is pulled toward the rear of said stock-section, said first flat-bar section is moved conjointly therewith, so that said rear end of said first section pivots said holding and releasing lever against the force of said spring means to thereby release said catch-lever to free said spear-shaft.

12. The spear gun according to claim 11, wherein said second pull-member is operatively positioned in said upper notch of said line-release release means.

13. The spear gun according to claim 12, wherein said stock-section comprises a groove formed in a lower surface thereof in which said first flat-bar section slides.

14. The spear gun according to claim 13, wherein said line-release pivotal lever extends substantially horizontally outwardly from the undersurface of said stock-section, and said second pull-member extends substantially vertically-downwardly from said stock section; said upper notch lying substantially in a horizontal plane during the non-release state thereof.

15. In a spear gun for use in underwater diving comprising a main stock section, a bore in which is positionable a spear shaft, line-release means for releasing the retrieving-line of the spear shaft, triggering means for releasing a spear shaft, and rubber-band means for powering the spear shaft upon triggering, wherein the improvement comprises:

said line-release means comprising a horizontally pivotal lever having an outer engaging means, said pivotal lever lying in and being rotatable substantially in a horizontal plane at right angles to the longitudinal central axis of said stock-section;

said triggering means comprising means for holding and releasing a spear-shaft in the bore mounted in the rear of said stock-section and rearwardly of said pivotal level, said triggering means further comprising a triggering element comprising a first flat-bar section having a forward end and a rear end slidable in the lower portion of said stock-section forwardly of said means for holding and releasing, and a second pull-section connected to said forward end of said first section for conjoint motion therewith; said rear end being operatively associated with said means for holding and releasing for causing the selective disengagement thereof with the end of a spear-shaft via rearward movement of said pull-section; said pull section being vertically oriented and at right angles with respect to said pivotal lever, said engaging means facing rearwardly toward said pull-section, a portion of said pull-section being operatively contacted by said outer engaging means in the ready-to-shoot state of the gun;

said triggering means further comprising spring means for retaining said means for holding and releasing in its holding state; said spring means, via said mean for holding and releasing, also urging said pull-section into operative engagement with said engagement means of said pivotal lever to prevent the pivotal rotation of said pivotal lever into its line-release state.

16. The improvement according to claim 15, wherein said engaging means comprises a notch, said notch and said part of said pull-section having the same cross-sectional shape, said part of said pull-section being received inside said notch in the ready-to-shoot state of said gun to prevent rotation of said pivotal lever.

* * * * *